UNITED STATES PATENT OFFICE.

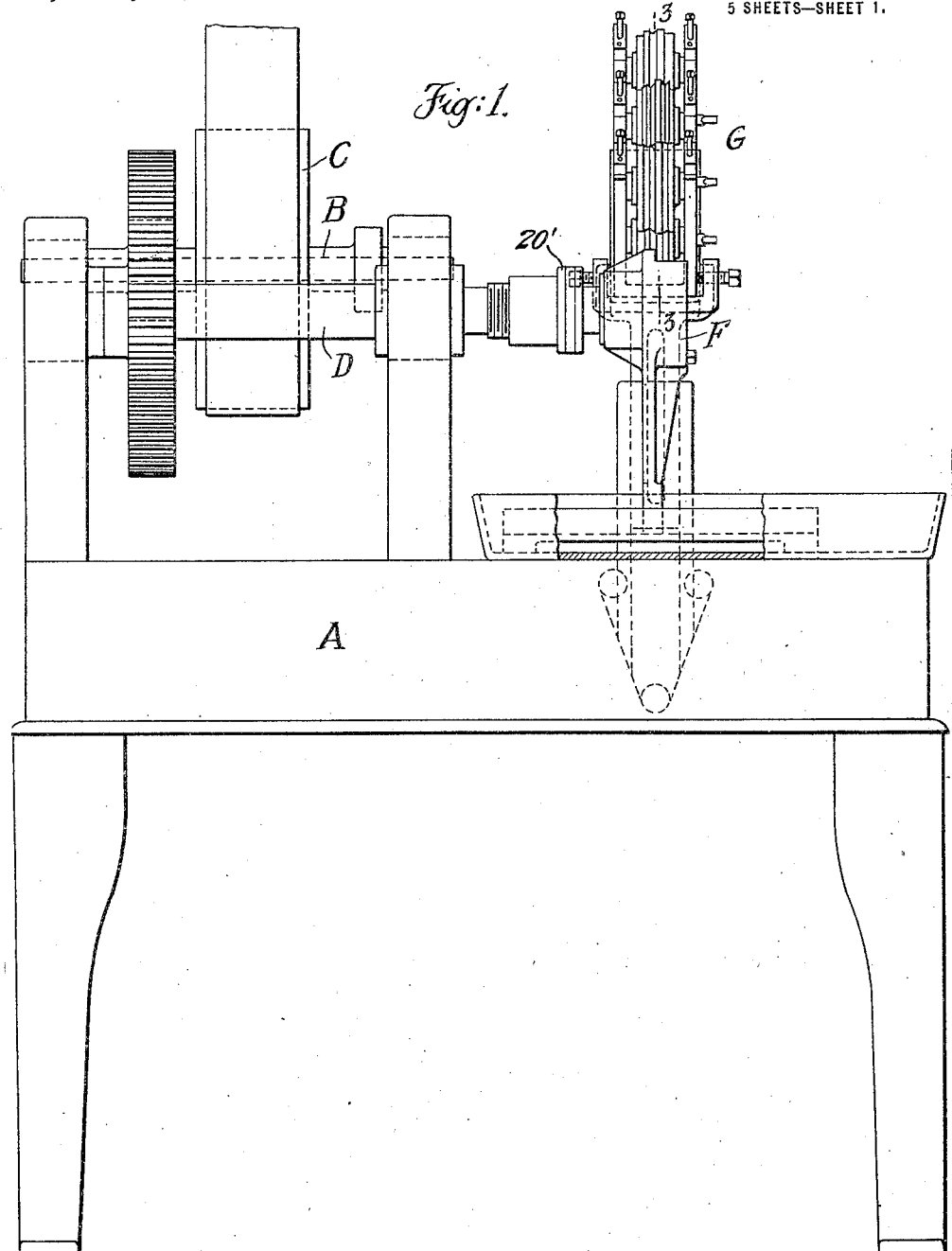

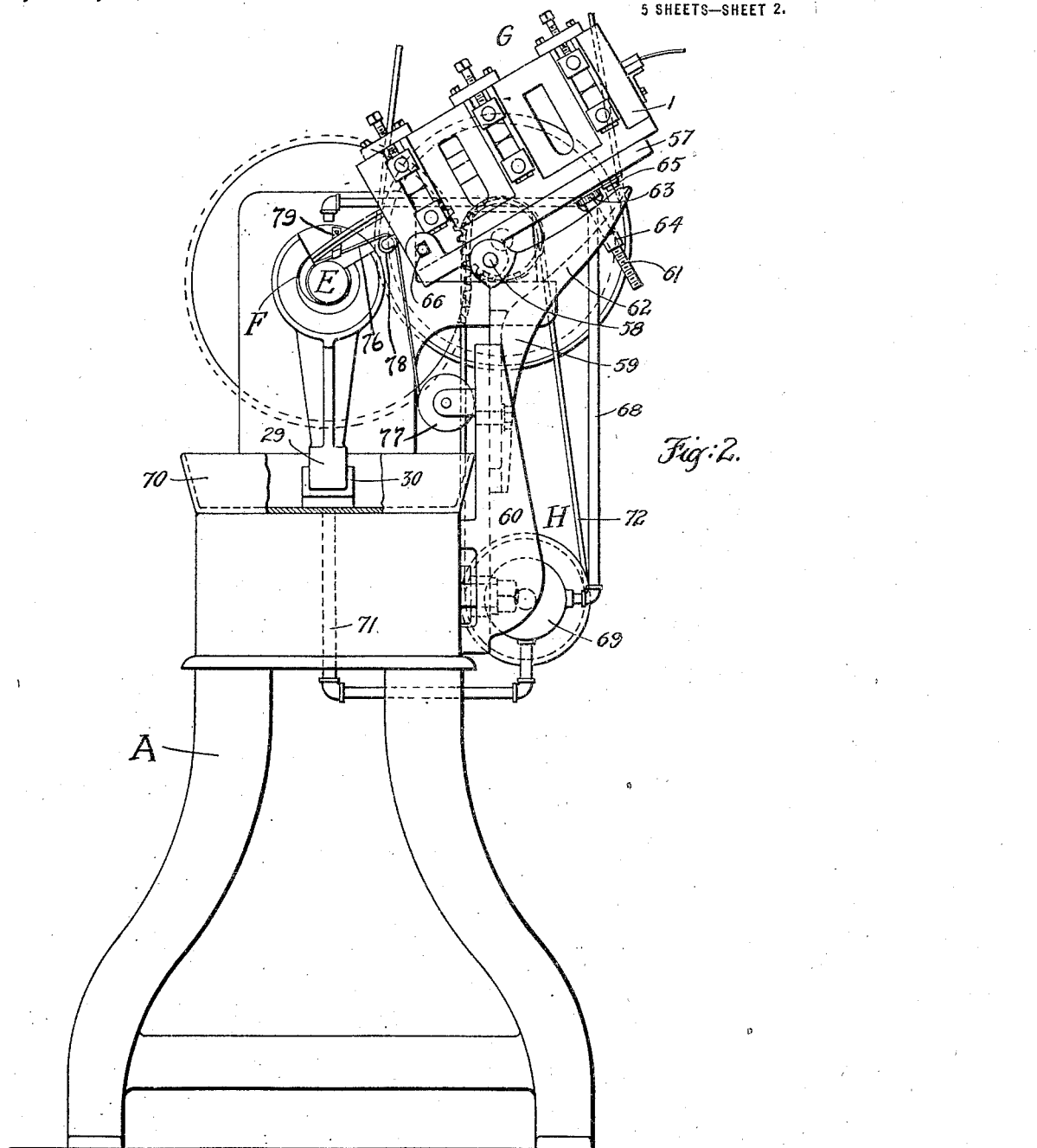

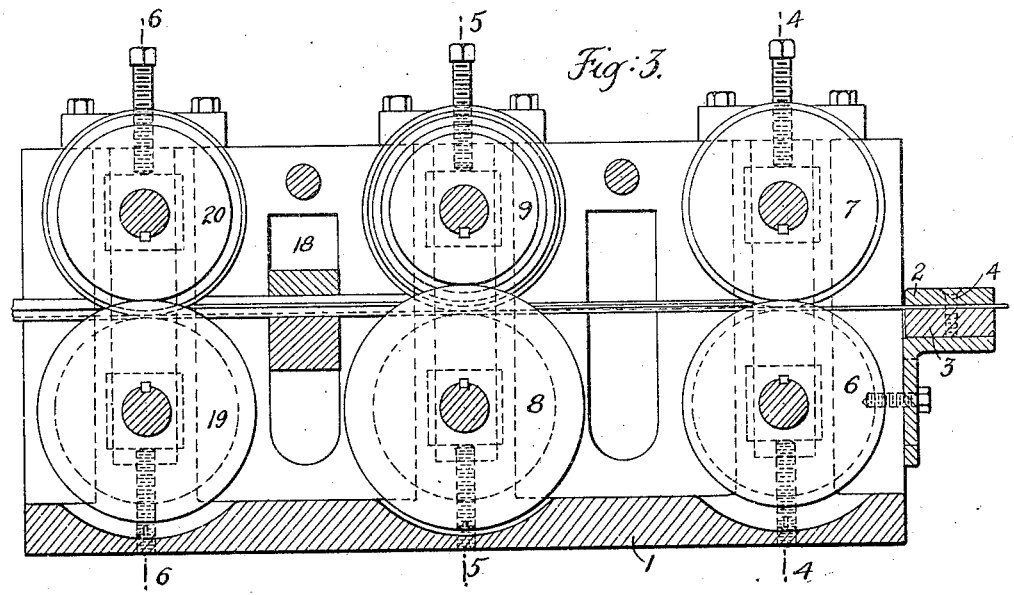
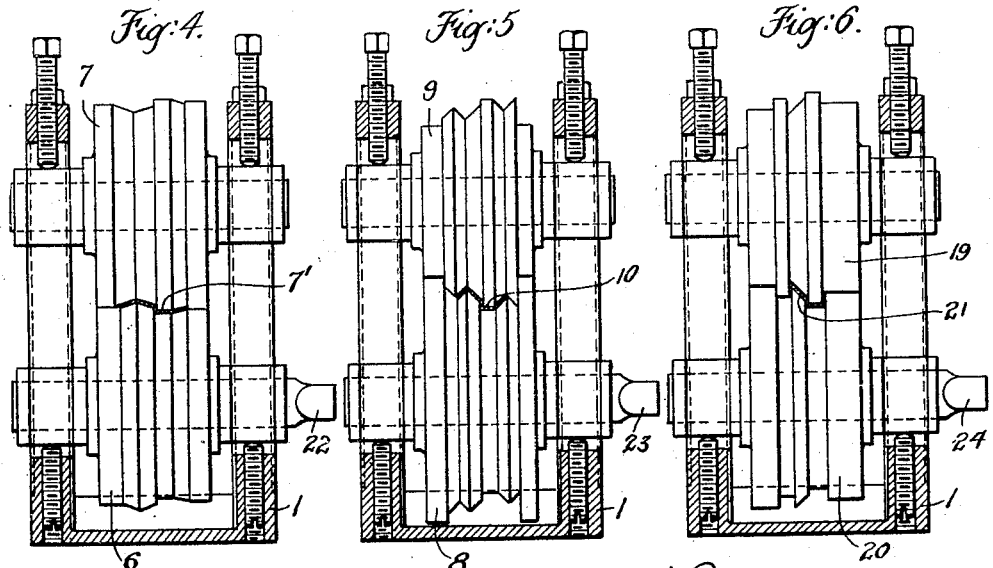

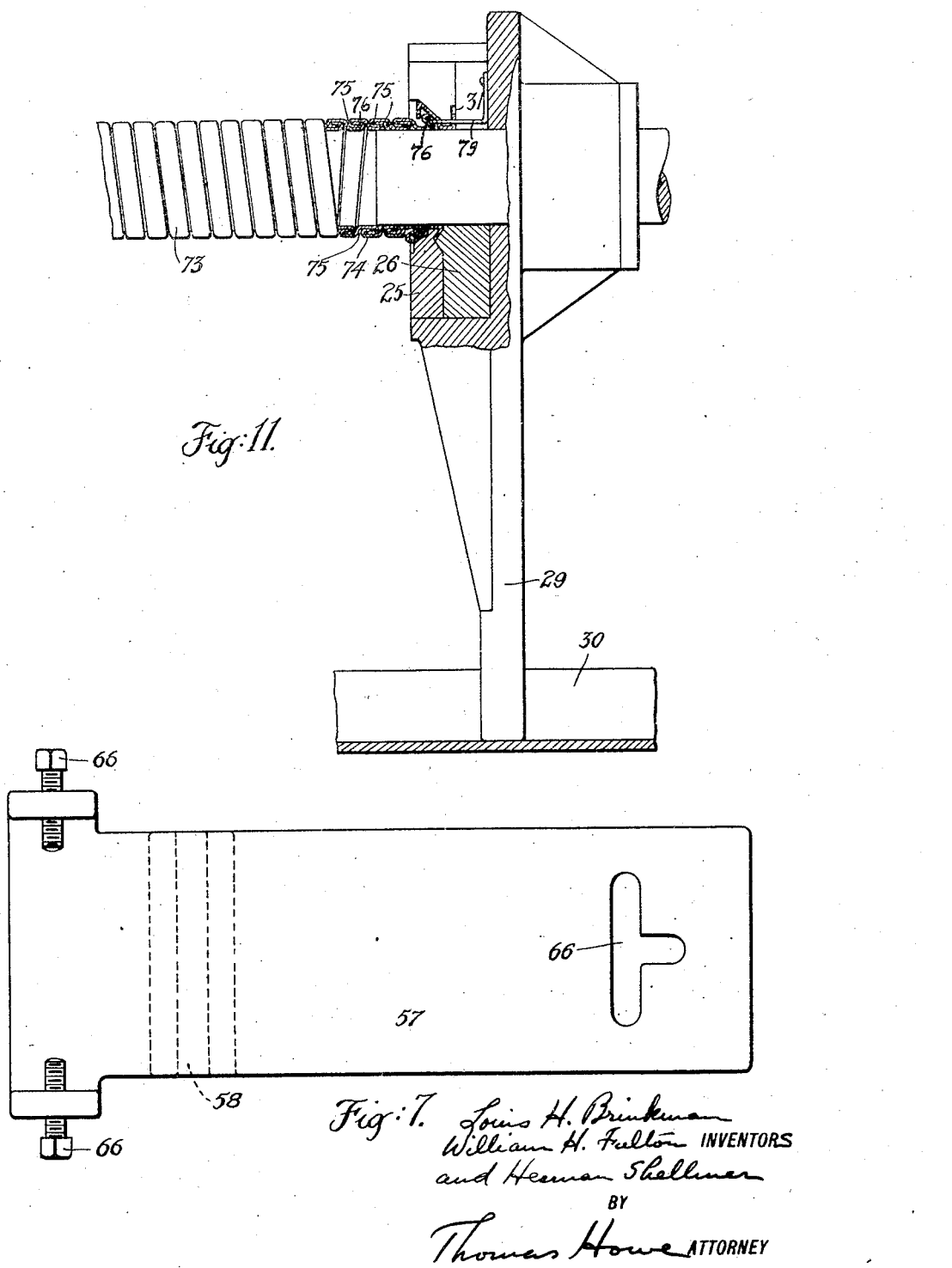

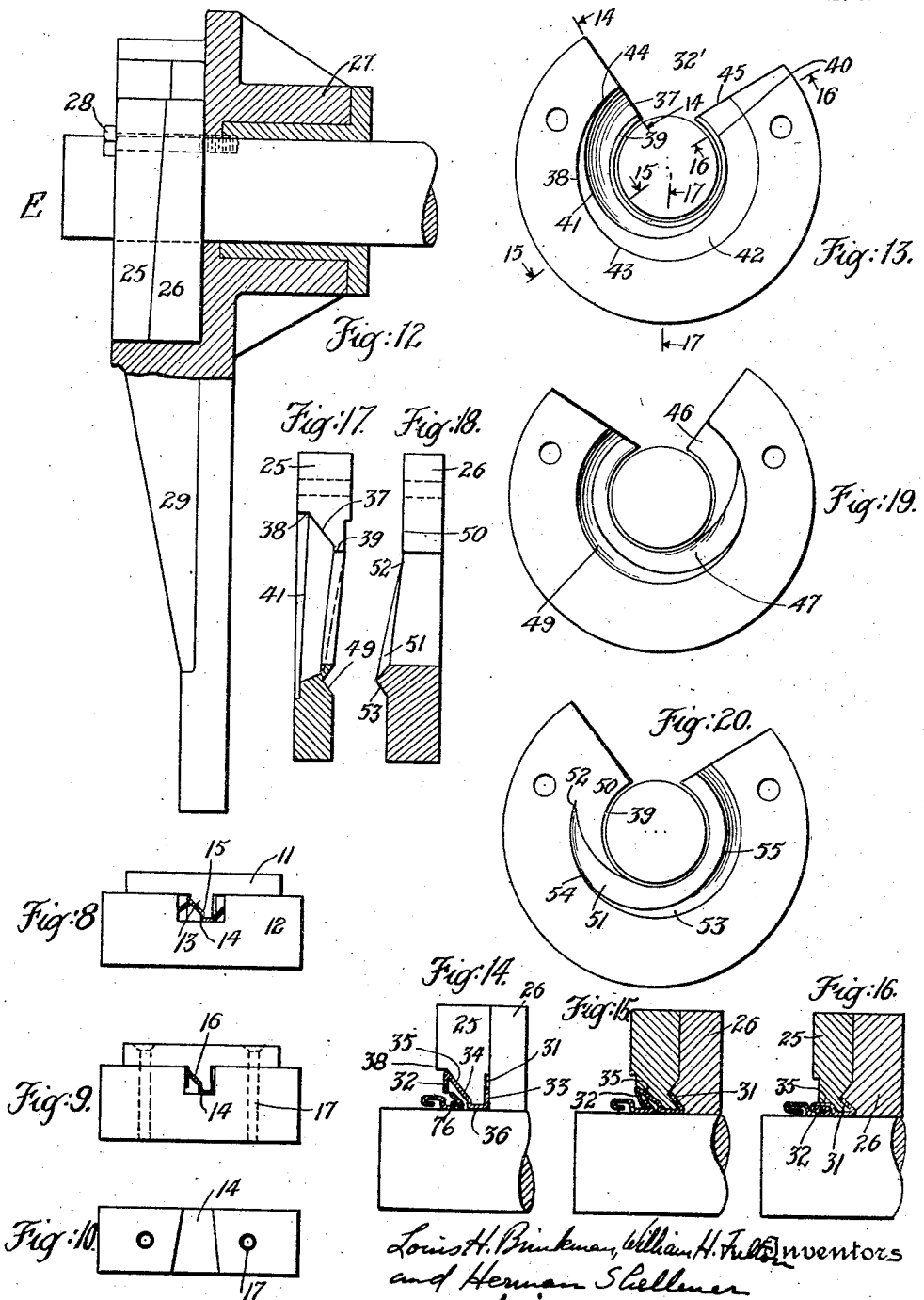

LOUIS H. BRINKMAN, OF GLEN RIDGE, WILLIAM H. FULTON, OF IRVINGTON, AND HERMAN SHELLMER, OF NEWARK, NEW JERSEY, ASSIGNORS TO TITEFLEX METAL HOSE CORPORATION, A CORPORATION OF NEW YORK.

APPARATUS FOR MAKING TUBES.

1,383,187. Specification of Letters Patent. Patented June 28, 1921.

Application filed March 8, 1917. Serial No. 153,263.

*To all whom it may concern:*

Be it known that we, LOUIS H. BRINKMAN, WILLIAM H. FULTON, and HERMAN SHELLMER, citizens of the United States, residing at Glen Ridge, county of Essex, and State of New Jersey; Irvington, county of Essex, and State of New Jersey; and Newark, county of Essex, and State of New Jersey, respectively, have invented new and useful Improvements in Apparatus for Making Tubes, of which the following is a specification.

This invention relates to tubes formed from a strip and is particularly adapted for use in connection with the formation of such tubes where any flexibility which they may have is due principally to sliding in the joints between adjacent convolutions. Such tubes may be made of heavier material than those wherein the flexibility of the tube is due to flexure of the strip sections as, for instance, in corrugated tubes. These heavier tubes are suitable as protecting coverings for the lighter corrugated tubes and in various applications where tubes of strong mechanical characteristics are desired. The forming of the heavier stock, however, is in many respects different from that of the lighter tubes and it is one object of the present invention to provide improved apparatus for forming the heavy class of tubes referred to.

It is to be understood, however, that the invention is not limited to the applications above referred to.

Other and ancillary objects of the invention will appear hereinafter.

In the accompanying drawings which illustrate the invention,

Figure 1 is a side elevation of tube making apparatus;

Fig. 2 is an end elevation of the apparatus of Fig. 1, viewed from the right end of the latter figure;

Fig. 3 is a section, on an enlarged scale, of the apparatus for preliminarily forming the strip prior to its entry into the die, the section being taken on the line 3—3 of Fig. 1, Fig. 4 is a section on the line 4—4 of Fig. 3, Fig. 5 is a section on the line 5—5 of Fig. 3, Fig. 6 is a section on the line 6—6 of Fig. 3, Fig. 7 is a top plan view of the supporting plate for the apparatus as shown in Figs. 3 to 6 inclusive, Fig. 8 is an end view of the entrance end of a stationary former located between the pairs of rolls shown in Figs. 5 and 6;

Fig. 9 is an elevation of the other end of the apparatus of Fig. 8;

Fig. 10 is a top plan view of the bottom portion of the apparatus shown in Figs. 8 and 9;

Fig. 11 is a side elevation of the die, partly in section, about the mandrel, and its support showing a tube in process of formation and also a completed tube extending from the apparatus;

Fig. 12 is a side elevation of the die and support, partly in section, the die sections carrying the bending channels being shown in side elevation;

Fig. 13 is an end elevation of the die sections viewed from the left of Figs. 11 and 12;

Fig. 14 is an elevation of the face on the line 14—14 of Fig. 13, this being the entrance face of the die, and showing a tube in process of formation;

Fig. 15 is a section on the line 15—15 of Fig. 13;

Fig. 16 is a section on the line 16—16 of Fig. 13,

Figs. 17 and 18 are sections on the line 17—17, of Fig. 13, these views being similar to the views of the sections as shown in Fig. 11, but with the sections separated, Fig. 19 is a face view of the die section shown in Fig. 17, looked at from the right of that figure, and Fig. 20 is a face view of the section shown in Fig. 18 looked at from the left of that figure.

Referring to the drawings, the apparatus comprises a frame A in which is rotatably mounted a counter-shaft B carrying the driving pulley C. The counter-shaft B is connected through reducing gearing with a spindle D to which is secured a rotating mandrel E. About the mandrel E is the die F for forming the strip into the tube, the strip having been preliminarily formed by means of the apparatus G. A circulating system H for supplying lubricating liquid to the die may be provided.

Referring to the apparatus more in detail the preliminary former comprises a frame 1, which, at its strip entrance end, carries two blocks 2 and 3 which guide the strip and may be secured together by means of screws 4. A flat ribbon enters into the apparatus between the blocks 2 and 3. From this device the strip passes in between the rollers 6 and 7 which are rotatably mounted in adjustable bearings in the frame 1. The circumferences of these rolls are as shown in Fig. 4, and between them they form the strip so that it has a cross section as indicated at 7'. The strip then passes on between the rollers 8 and 9, which are also rotatably mounted in adjustable bearings in the frame 1. The circumferences of these rollers are as shown in Fig. 5, and they further form the strip section into a shape as shown at 10 in that figure. The strip then passes into the stationary former (see Figs. 8 to 10 inclusive) having an upper portion 11 and a bottom portion 12. The upper part 11 has a longitudinally extending integral projection of a uniform cross section as shown at 13. This projection enters within the groove 14 in the bottom portion, the longitudinal center lines of the projection and groove being in the same plane. The groove 14, tapers laterally from the inlet to the outlet so that the former receives the strip of the section as shown at 15 and delivers it of a section as shown at 16. The two halves of the former may be held in proper relative positions by means of screws as 17 and may be supported by the strip, it being prevented from movement longitudinally of the strip by reason of its ends engaging with slots as 18 in the sides of the frame 1. The strip then passes between the rollers 19 and 20 having peripheries as shown at Fig. 6 and whereby the strip is formed to have a section as shown at 21. Certain of the roller shafts may have squared ends as 22, 23 and 24 to which a wrench may be applied to turn the rolls on threading in the strip. The strip then passes into the die surrounding the cylindrical mandrel E. The die comprises two segmental die sections 25 and 26 which are secured in a die casing 27 by means of screws 28. The mandrel has a running fit in the die casing which is prevented from turning by means of an arm 29 which extends into a slot 30 on the frame which does not, however, prevent the die from longitudinal movement although it is so limited by coming against the adjustable nut 30' screw threaded on the mandrel. Between the die sections 25 and 26 is formed a bending channel 31 for the strip edge while a bending channel for the other edge of the strip is formed at the outer face of the segment 25. By dividing the die through the bending channels it renders the cut surface more accessible so that the construction of the channels is facilitated and accuracy of the work is promoted. By making the die sections segmental, a recess 32' is provided through which the strip may be fed into the die. As the strip enters the die (see Fig. 14) it is of a section the extremities 32 and 33 of which are radial as is also the intermediate portion 34, the other intermediate portions being the inclined part 35 and the horizontal part 36.

The radial part 34 is substantially equal to three thicknesses of the strip, the sloping portion 35 is of greater length than the radial portion 33 and the portion 36 is of greater length than the radial portion 32 so that when the edges of the convolutions are interfolded there will be clearances permitting longitudinal sliding in the joint. As the strip progresses about the die it is bent transversely as follows: The outer side of the part 35 gradually contracts radially, while the portion in the channel 31 is gradually bent over to one side until at the position indicated by the line 15—15 of Fig. 13 the strip is of a cross section as shown in Fig. 15. As the strip proceeds about the die, the inclined wall against which the portion 35 bears is contracted still more, also the channel 31 is bent still more to the left, until the strip section is as shown in Fig. 16. As the strip enters the die the portions 35 and 32 overhang the adjacent edge of the preceding convolution as shown in Fig. 14. These adjacent edges will be gradually bent into interfolded relation, an intermediate position being shown in Fig. 15, until finally the folded position is reached as shown in Fig. 16, the free edge of the convolution being bent into the position as shown at the right of Fig. 16, so as to be adapted to receive the adjacent edge of the succeeding convolution. The mandrel projects through the die for such length that the helical convolutions of the strip will be of a number so that the torsional frictional grip of the mandrel on the convolutions will be sufficient to draw the strip through the apparatus.

To refer more in detail to the structure of the bending channels, the sloping surface, against which the portion 35 bears, at the entrance to the channel i. e. in the plane of the line 14, is as shown at 37 (see Figs. 13 and 17) and between this sloping surface and the outer face of the die is a cylindrical portion 38, while between the sloping surface and the mandrel is a radial face 39. This radial face 39 is of substantially the same width entirely about the segment, (see Fig. 13). The sloping face 37 gradually has its outer end drawn in radially as it progresses about the mandrel until it finally becomes substantially parallel to the mandrel axis as shown at 40. As this change in the surface 37 takes place, a shoulder 41 is gradually developed so that the counter-sunk surface 42 between the shoulder 41 and the shoulder 43 (which is at the outer face of the die), beginning at 44 gradually widens until it extends from the shoulder 43 to the width 45 at the exit end, the surface at 45 having a width equal to the radial distance from the outer edge of the surface 39 to the shoulder 43.

The other side of the segment 25, (see Figs. 19 and 17) has at its entrance end a radial, counter-sunk face 46, which gradually merges into the inclined face 47 forming one side of the groove 48, the other side of the groove being formed by the inclined side 49. It will be seen that the groove 48 becomes deeper as it progresses from its beginning about the die, and that its sides become more sloping until the desired slope has been reached so that the desired bending of the strip edge will be accomplished. The groove then proceeds in a uniform cross section to the exit side of the die. The part 33 of the strip is held against the face 46 and groove side 47 by means of the coöperating die section 26, (see Figs. 18 and 20). The section 26 has a radial face 50 forming one side of the channel 31. From the radial face rises a projection having a side 51 beginning at 52 and gradually increasing in height from its beginning to its maximum, while the other side of the projection is formed by the surface 53 beginning at 54 and gradually increasing in height and width as it proceeds from its beginning about the segment. The sloping sides 51 and 53 of the projection meet along an apex line 55. The surface 53 fits against the face 49 and the face 51 parallels the face 47 but does not contact therewith, there being a clearance between them of substantially the thickness of the strip so that the strip edge to be bent may pass between them.

The preliminary forming apparatus G is supported by having its frame 1 mounted upon the plate 57 which is pivoted at 58 on a support 59 which is vertically adjustable in the bracket 60 secured to the frame A. The plate 57 may be adjusted about the axis 58 by means of a screw 61 which slides in a slot in the lateral arm 62 of the support 59 so as to be moved nearer to or farther away from the axis 58. The screw 61 has a head 63 which is interposed between the plate 57 and the arm 62. It will be observed that the top surface of the arm 62, against which the head 63 bears, slopes upwardly, so that when the screw head is moved toward the axis 58 the plate 57 may turn downwardly, the intake end of the apparatus being then lowered, while if the screw head is moved away from the axis 58 the intake end will be supported in a more elevated position. The screw 61 may be secured in any adjusted position by means of a nut 64. The frame 1 of the preliminary former rests upon the supporting plate 57 and may be adjustably secured thereto by a screw 65 which passes through the opening 66 in the plate 57 and screws into the base plate of the frame 1. The forward end of the frame 1 is engaged on each side by an adjusting screw 66, screw-threaded into an ear on the supporting plate 57. The apparatus G may therefore be adjusted to the most desirable elevation, may be angularly adjusted vertically and may also be angularly and bodily adjusted upon the supporting plate.

Lubricating liquid may be supplied to the work in the die through a pipe 68, it being forced therethrough by means of a pump 69. The drip from the die is caught in a pan 70 whence it is returned to the pump through the pipe 71. The pump may be driven by means of a belt 72 driven by the counter shaft B.

It will now appear that the strip, which was of a flat, ribbon form originally, passes through the apparatus G, as before described, and then enters within the die F. It is helically wrapped about the mandrel, the bending channels for the strip edges in the die being helically arranged, and the torsional frictional grip of the mandrel on the strip draws the strip through the forming apparatus. These channels serve to interfold the edges of adjacent convolutions as before described and by reason of the helical arrangement of the channels the die acts in a manner similar to a nut upon the convolutions of the strip so that as the tube forming operation progresses the tube is forced axially of the mandrel, the mandrel surface being smooth so as to permit longitudinal sliding along it, and the completed tube is continuously fed off the end of the mandrel for any length of time desired so that any length of tube may be formed. The tube is shown in exterior at 73 and in section at 74, with clearances at 75 so that the interfolded parts in the joints may slide longitudinally of the tube with relation to each other. Where desired a packing such as a cord of asbestos 76 may be wound into the joint to make it tight or cushion the abutting parts. This cord may be drawn from a reel 77 mounted on the machine frame whence it passes over a guide roller 78 and then into the joint, being properly directed into position by means of a finger 79 secured to the die.

While the invention has been illustrated by an embodiment of apparatus recited in detail, the invention may have other embodiments than those shown in the drawings and may be varied without departing from its spirit; the invention is not therefore limited to the structures shown in the drawings nor to the precise details as recited.

What we claim is:—

1. In apparatus for forming a tube from a strip, the combination with a stationary die having channels bending the strip transversely for interfolding the edges of adjacent convolutions, the parts of said die being relatively stationary, of a rotating mandrel, about which the strip is coiled, centrally arranged within the die and a preliminary former comprising rolls initiating the bends in the strip section.

2. In apparatus for forming a tube from a strip, the combination with a stationary die having channels bending the strip transversely for interfolding the edges of adjacent convolutions, of a rotating mandrel, about which the strip is coiled, centrally arranged within the die, a preliminary former of the strip previous to its entry into the die and means for adjusting said former with relation to the die.

3. In apparatus for forming a tube from a strip, the combination with a stationary die having channels bending the strip transversely for interfolding the edges of adjacent convolutions, of a rotating mandrel, about which the strip is coiled, centrally arranged within the die, a preliminary former of the strip previous to its entry into the die and means for adjusting said former in a plane radial of the mandrel.

4. In apparatus for forming a tube from a strip, the combination with a stationary die having channels bending the strip transversely for interfolding the edges of adjacent convolutions, of a rotating mandrel, about which the strip is coiled, centrally arranged within the die, a preliminary former of the strip previous to its entry into the die and means for adjusting said former bodily and angularly in a plane radial of the mandrel.

5. In apparatus for forming a tube from a strip, the combination with a stationary die having channels bending the strip transversely for interfolding the edges of adjacent convolutions, of a rotating mandrel, about which the strip is coiled, centrally arranged within the die, a preliminary former of the strip previous to its entry into the die and means for adjusting said former in a plane longitudinal of the mandrel.

6. In apparatus for forming a tube from a strip, the combination with a stationary die having channels bending the strip transversely for interfolding the edges of adjacent convolutions, of a rotating mandrel, about which the strip is coiled, centrally arranged within the die, a preliminary former of the strip previous to its entry into the die and means for adjusting said former bodily and angularly in a plane longitudinal of the mandrel.

7. In apparatus for forming a tube from a strip, the combination with a stationary die having channels bending the strip transversely for interfolding the edges of adjacent convolutions, of a rotating mandrel, about which the strip is coiled, centrally arranged within the die, a preliminary former of the strip previous to its entry into the die and means for adjusting said former angularly and bodily in planes radial and longitudinal of the mandrel.

8. In apparatus for forming a tube from a strip, the combination with a stationary die, of a rotatable mandrel about which the strip is coiled and to which the strip is secured by a torsional, frictional grip to draw it through the die, said die having channels bending the strip transversely adapted to interfold the edges of the strip in spaced relation to permit longitudinal sliding of the interfolded parts.

9. In apparatus for forming a tube from a strip, the combination with a stationary die, of a rotatable mandrel about which the strip is coiled and to which the strip is secured by a torsional, frictional grip to draw it through the die, said die having channels bending the strip transversely adapted to interfold the edges of the strip in spaced relation to permit longitudinal sliding of the interfolded parts and a preliminary former for shaping the cross section of the strip prior to its entry into the die.

10. In apparatus for forming a tube from a strip, the combination with a stationary die, of a rotatable mandrel about which the strip is coiled and to which the strip is secured by a torsional, frictional grip to draw it through the die, said die having channels bending the strip transversely adapted to interfold the edges of the strip in spaced relation to permit longitudinal sliding of the interfolded parts and rolls for shaping the cross section of the strip prior to its entry into the die.

11. In apparatus for forming a tube from a strip, the combination with a stationary die having channels bending the strip transversely for interfolding the edges of adjacent convolutions, of a rotating mandrel, about which the strip is coiled, centrally arranged within the die, and means for feeding a packing into the joint formed by interfolding the said edges.

In testimony whereof we WILLIAM H. FULTON and HERMAN SHELLMER have signed this specification this first day of March, 1917, and I, LOUIS H. BRINKMAN, have signed this specification this sixth day of March, 1917.

LOUIS H. BRINKMAN.
WILLIAM H. FULTON.
HERMAN SHELLMER.